(12) United States Patent
Yamaguchi et al.

(10) Patent No.: US 7,306,772 B2
(45) Date of Patent: Dec. 11, 2007

(54) EXHAUST GAS PURIFICATION APPARATUS

(75) Inventors: Yasuaki Yamaguchi, Yokohama (JP); Katsuhiro Shibata, Tokyo (JP); Ken Oouchi, Yokohama (JP); Kimiyoshi Nishizawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 616 days.

(21) Appl. No.: 10/240,597

(22) PCT Filed: Apr. 30, 2002

(86) PCT No.: PCT/JP02/04304

§ 371 (c)(1),
(2), (4) Date: Oct. 3, 2002

(87) PCT Pub. No.: WO02/090735

PCT Pub. Date: Nov. 14, 2002

(65) Prior Publication Data

US 2003/0091480 A1    May 15, 2003

(51) Int. Cl.
*B01D 50/00* (2006.01)
(52) U.S. Cl. .............. 422/179; 422/177; 422/180
(58) Field of Classification Search ........... 422/177, 422/179, 180, 221
See application file for complete search history.

(56) References Cited

U.S. PATENT DOCUMENTS

| | | | | |
|---|---|---|---|---|
| 3,189,418 A | * | 6/1965 | Gary | ............ 422/176 |
| 4,969,264 A | | 11/1990 | Dryer et al. | |
| 5,079,210 A | | 1/1992 | Kaji et al. | |
| 5,330,728 A | * | 7/1994 | Foster | ............ 422/177 |
| 5,455,097 A | | 10/1995 | Machida et al. | |
| 5,895,700 A | * | 4/1999 | Yamada et al. | ............ 428/116 |
| 6,555,070 B1 | * | 4/2003 | Kruger | ............ 422/179 |
| 6,759,015 B2 | * | 7/2004 | Peisert | ............ 422/179 |

FOREIGN PATENT DOCUMENTS

| | | | |
|---|---|---|---|
| CA | 2298903 | * | 10/2000 |
| DE | 35 09 790 A1 | | 10/1986 |
| DE | 42 44 315 A1 | | 3/1994 |
| JP | 1-95524 | | 6/1989 |
| JP | 5-38317 | | 5/1993 |
| JP | 06-277524 A | | 10/1994 |
| JP | 2000-073746 A | | 3/2000 |
| JP | 2000-161050 A | | 6/2000 |
| JP | 2000-240440 A | | 9/2000 |

* cited by examiner

*Primary Examiner*—Glenn Caldarola
*Assistant Examiner*—Tom Duong
(74) *Attorney, Agent, or Firm*—Foley & Lardner LLP

(57) ABSTRACT

An exhaust gas purification apparatus for an automotive internal combustion engine. The apparatus comprises a casing that forms a part of an exhaust gas passage of the engine. A substrate, disposed in the casing, carries a substrate to purify exhaust gas. A supporting mat is provided to support the substrate in the casing by being located between the substrate and the casing. The supporting mat has a depression to trap foreign matters at an upstream-side end of the supporting mat, the upstream-side end facing upstream side of exhaust gas flow in the exhaust gas passage.

22 Claims, 13 Drawing Sheets

VERTICAL DIRECTION

EXHAUST GAS PURIFICATION APPARATUS

This application is a 35 U.S.C. 371 National Stage filing of PCT/JP02/04304 on Apr. 30, 2002.

TECHNICAL FIELD

This invention relates to improvements in an exhaust gas purification apparatus such as a catalytic converter for purification of exhaust gas discharged from an internal combustion engine, and more particularly to a technique for protecting a catalyst carrier of the catalytic converter from being damaged by foreign matters such as welding spatter.

BACKGROUND ART

Most automotive vehicles are equipped with catalytic converters for purification of exhaust gas discharged from an internal combustion engine. The catalytic converters have been confirmed to have the following problems: When foreign matters such as welding spatter (produced during formation of exhaust manifold by pipe-welding or the like in a production process), remaining molding sand for casting, turnings produced in machining, and metal oxides produced during operation of the internal combustion engine reach a catalyst carrier in the catalytic converter, the foreign matters stay and move around on the upstream-side end face of the catalyst carrier without passing through the catalyst carrier. At this time, the foreign matters such as welding spatter move around on the upstream-side end face of the catalyst carrier, and therefore the upstream-side end face of the catalyst carrier will be changed in shape and damaged. Recently, such problems have become conspicuous owing to the fact that the honeycomb structure of the catalyst carrier has been reduced in wall thickness and increased in cell density in order to raise an exhaust gas purification efficiency, so that thereby the mechanical strength of the catalyst carrier is unavoidably lowered.

In view of the above problems, it has been proposed to trap the foreign matters such as welding spatter in order to prevent the foreign matters from moving around on the upstream-side end face of the catalyst carrier, as disclosed in Japanese Provisional Publication No. 2000-240440. This Publication discloses a carrier supporting mat for elastically supporting a monolithic catalyst carrier inside a casing. The carrier supporting mat in a flat state established before being wound around the catalyst carrier is formed at its end sections (to be jointed when the carrier supporting mat is wound) with inversed L-shaped portions and around its central section between the end sections with cuts which are generally parallel with the end sections. When the carrier supporting mat is wound around the catalyst carrier, the above inversed L-shaped portions are engaged with each other while the carrier supporting mat is brought into tight contact with the peripheral surface of the catalyst carrier upon a restoring force of the carrier supporting mat. Accordingly, long rectangular grooves and long V-shaped grooves are formed at the upstream-side end face of the carrier supporting mat in the wound state.

DISCLOSURE OF INVENTION

However, the following drawbacks have been encountered in the above-discussed conventional carrier supporting mat which has the long or deep grooves at the upstream-side end face thereof:

(a) The inherent supporting force of the carrier supporting mat is lowered thereby making it impossible to securely supporting the catalyst carrier.

(b) There is a widthwise section having an extremely small width in the carrier supporting mat, and therefore exhaust gas tends to leak through such a widthwise section.

(c) The strength of the carrier supporting mat becomes too low to maintain the inherent shape of the carrier supporting mat, thereby causing leak of exhaust gas and scattering of the material of the carrier supporting mat.

(d) Even if welding spatter and the like enter the grooves, the spatter and the like move around within the grooves thereby damaging the carrier supporting mat.

(e) According to engaging conditions of the inversed L-shaped sections and to the extension conditions of the carrier supporting mat, the sizes of the finally formed grooves change thereby providing the possibility of no clearance of the groove being made.

Additionally, the above Publication does not disclose or take account of a catalytic converter which is disposed in a vertical direction or in a direction inclined relative to the vertical direction and a catalytic converter disposed closed and immediately below an exhaust manifold. Therefore, the above-discussed conventional carrier supporting mat cannot effectively trap welding spatter and the like.

Therefore, it is an object of the present invention to provide an improved catalytic converter which can overcome drawbacks encountered in conventional catalytic converters which have a carrier supporting mat wound around a catalyst carrier.

Another object of the present invention is to provide an improved catalytic converter in which a catalyst carrier can be securely protected from being damaged while effectively preventing exhaust gas from leaking through a carrier supporting mat.

A further object of the present invention is to provide an improved catalytic converter in which foreign matters such as welding spatter can be effectively prevented from moving around on end face of a carrier supporting mat wound around a catalyst carrier, thereby securely trapping the foreign matters.

According to the present invention, an exhaust gas purification apparatus for an engine, comprises a casing that forms a part of an exhaust gas passage of the engine. A substrate, disposed in the casing, carries a substrate to purify exhaust gas. A supporting mat is provided to support the substrate in the casing by being located between the substrate and the casing. The supporting mat has a depression to trap foreign matters at an upstream-side end of the supporting mat, the upstream-side end facing upstream side of exhaust gas flow in the exhaust gas passage.

BRIEF DESCRIPTION OF DRAWINGS

In the drawings, like reference numerals designate like parts and elements throughout all figures, in which.

THE BEST MODE FOR CARRYING OUT THE INVENTION

Figure 1A:
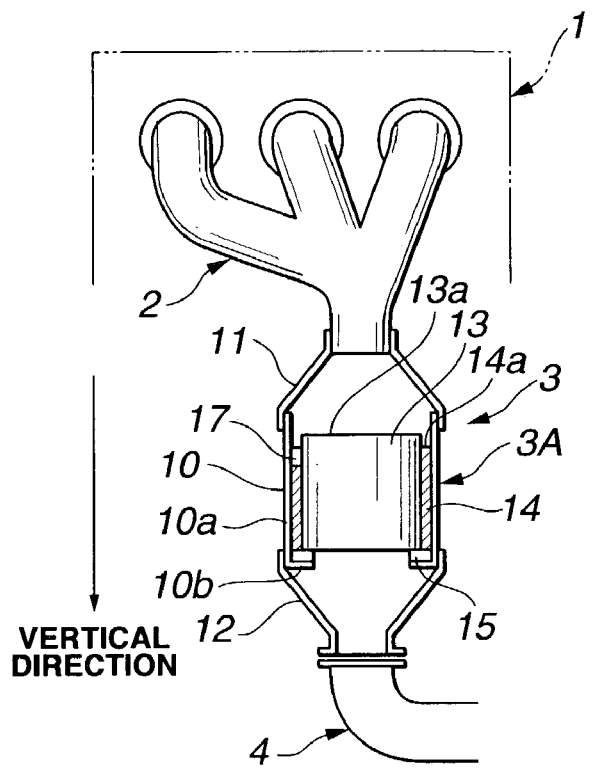
FIG. 1A is a schematic cross-sectional view of a first embodiment of a catalytic converter according to the present invention, installed in an installation mode to an exhaust system of an internal combustion engine.
Figure 1B:
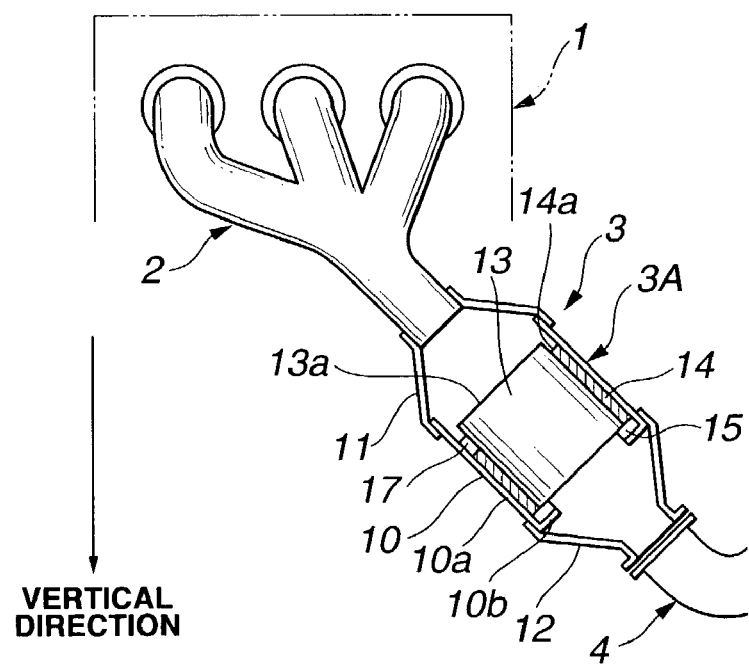
FIG. 1B is a schematic cross-sectional view similar to FIG. 1A but showing the first embodiment catalytic converter installed in another installation mode to the exhaust system.

Referring now to FIGS. 1A to 6C, more specifically FIG. 1A, of the drawings, a first embodiment of an exhaust gas purification apparatus or catalytic converter according to the present invention is illustrated generally by the reference numeral 3. Catalytic converter 3 is fixedly connected to a common exit pipe section of exhaust manifold 2 whose branch pipe sections are fixedly connected to cylinder head 1 of an internal combustion engine. The exhaust manifold of this embodiment is formed by pipe-welding or welding pipe-shaped members. The engine in this case is for an automotive vehicle. Catalytic converter 3 is located immediately below the common exit section of exhaust manifold 2 and positioned such that its axis extends vertically or in a vertical direction. Catalytic converter 3 may be positioned such that its axis is inclined relative to the vertical direction as shown in FIG. 1B.

Catalytic converter 3 includes casing 3A which serves as a part of an exhaust gas passageway through which exhaust gas discharged from the engine flows. Casing 3A includes cylindrical casing main body 10 having upstream-side and downstream-side end sections (with respect to flow of exhaust gas). Generally frustoconical and hollow diffusers 11, 12 are respectively welded to the upstream-side and downstream-side end sections of casing main body 10. Diffuser 11 is fixedly connected to the common exit section of exhaust manifold 2 by welding. It will be understood that the casing of catalytic converter 3 may be formed separate from exhaust manifold 2 and may be connected or joined with the exhaust manifold by bolting respective flanges of the catalytic converter casing and the exhaust manifold. Exhaust pipe 4 is fixedly connected to diffuser 12.

Catalyst carrier or substrate 13 is encased in casing main body 10 through catalyst carrier supporting mat 14. Carrier supporting mat 14 is wound around the outer peripheral surface of catalyst carrier 13. In other words, carrier supporting mat 14 is disposed or fitted between the inner peripheral surface of casing main body 10 and the outer peripheral surface of catalyst carrier 13. Casing main body 10 includes cylindrical section 10a to which carrier supporting mat 14 contacts. Annular flange section 10b is integral with a downstream-side end of cylindrical section 10a in such a manner to be perpendicular to the axis of cylindrical section 10a. Annular washer member 15 is disposed between the downstream-side end face (not identified) of catalyst carrier 13 and annular flange section 10b of casing main body 10. The downstream-side end face is located downstream relative to upstream-side end face 13a with respect to flow of exhaust gas discharged from the engine.

Catalyst carrier 13 is a ceramic monolithic catalyst carrier of the cylindrical column-line honeycomb structure. Catalyst carrier 13 is formed with a plurality of gas passages which axially extend from the upstream-side end face 13a to the downstream-side end face of catalyst carrier 13 of the catalyst carrier 13. The upstream-side end face is located upstream-side relative to the downstream-side end face with respect to flow of exhaust gas discharged from the engine. Each gas passage is defined by thin partition walls of ceramic. In this embodiment, the thin partition wall has a thickness of not larger than 0.1 mm, preferably 2 mil (=0.064 mm) so as to raise a cell density of largely reduced in thickness as compared with the partition walls of usually used similar catalyst carriers which partition walls have a thickness of 8 mil (=0.220 mm) or a thickness of 4 mil (=0.110 mm). Catalyst(s) or catalyst components (metals) are carried on the thin partition walls of catalyst carrier 13. In other words, the surface of the thin partition walls of catalyst carrier 13 are coated with a coat layer containing the catalyst component(s).

Figure 2:
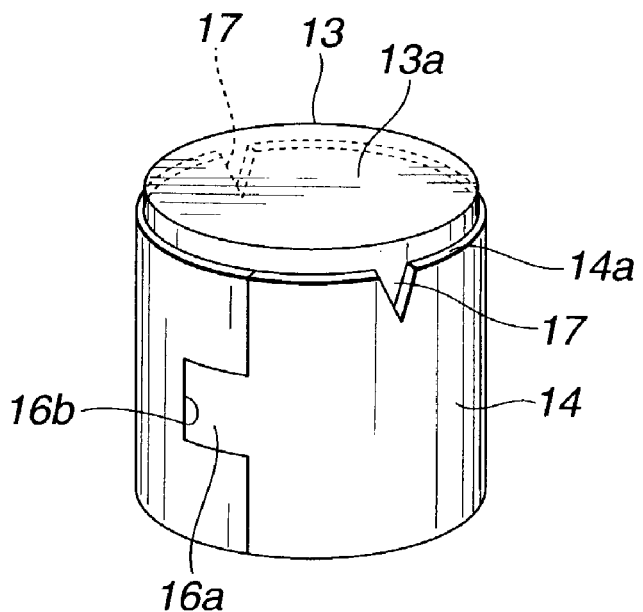
FIG. 2 is a perspective view of a carrier supporting mat of the catalytic converter of FIG. 1A, wound around a catalyst carrier to establish a wound state.
Figure 3:
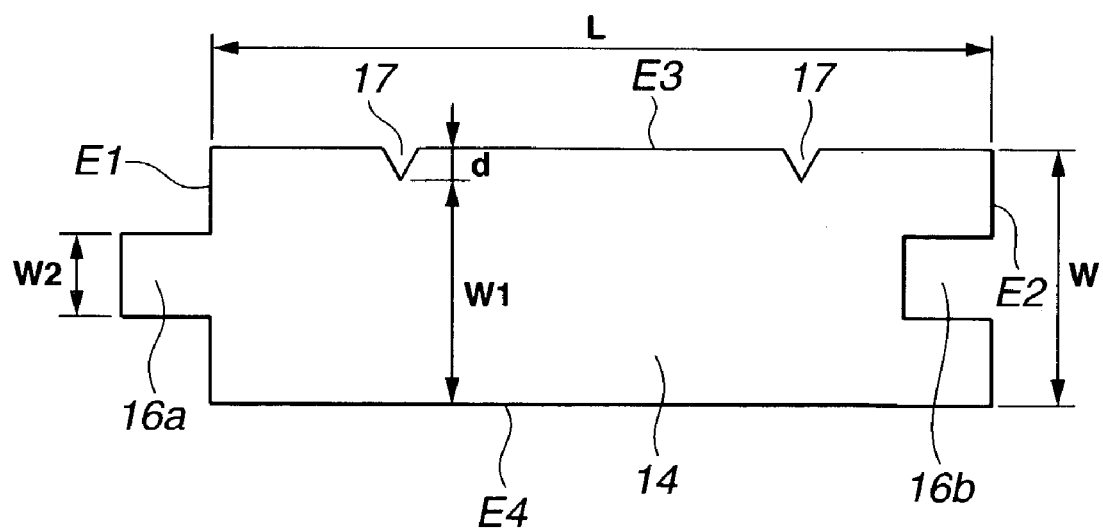
FIG. 3 is a development elevation of the carrier supporting mat of FIG. 2.

Carrier supporting mat 14 is formed of, for example, ceramic fiber, alumina fiber or vermiculite, and is non-expansive. Such non-expansive carrier supporting mat 14 is available from Minnesota Mining & Mfg. (3M Company) under the trade name of "Interam-mat". Carrier supporting mat 14 is wound around the outer peripheral surface of catalyst carrier 13 as shown in FIG. 2. Carrier supporting mat 14 is flat and generally belt-shaped before being wound around catalyst carrier 13 as shown in FIG. 3 representing a development elevation of carrier supporting mat 14. Carrier supporting mat 14 in a flat or developed state established before being wound around the catalyst carrier has a length L corresponding to the dimension of the outer periphery of catalyst carrier 13, and a width W corresponding to the axial length of catalyst carrier 13 (or the length of the catalyst carrier in a direction in which exhaust gas flows).

As shown in FIG. 2, when carrier supporting mat 14 is in a wound state established after being wound around the outer peripheral surface of catalyst carrier 13, upstream-side end face 14a of carrier supporting mat 14 and upstream-side end face 13a of catalyst carrier 13 are not flash with each other, and therefore upstream-side end face 14a of carrier supporting mat 14 is positioned slightly lower than or downstream relative to upstream-side end face 13a of catalyst carrier 13 with respect to flow of exhaust gas discharged from the engine so as to form an annular groove between the inner peripheral surface of casing main body 10 and the outer peripheral surface of catalyst carrier 13. Upstream-side end face 14a of carrier supporting mat 14 is located upstream relative to the downstream-side end face (not identified) of the carrier supporting mat with respect to flow of exhaust gas discharged from the engine. Additionally, as shown in FIG. 3, carrier supporting mat 14 in the flat state has lengthwise directional first and second end edges E1, E2 which are opposite to each other. Rectangular projection 16a is formed at first end edge E1 and located at a widthwise directional central part, whereas rectangular cutout 16b is formed at lengthwise directional second end edge E2 and located at the widthwise direction central part, so that the positions of projection 16a and cutout 16b correspond to each other. When carrier support mat 14 is wound around the outer peripheral surface of catalyst carrier 13 or put into the wound state as shown in FIG. 2, projection 16a is fitted in cutout 16b thereby preventing exhaust gas from leaking through a clearance between lengthwise directional first and second end edges E1, E2 of carrier support mat 14.

Figure 5:
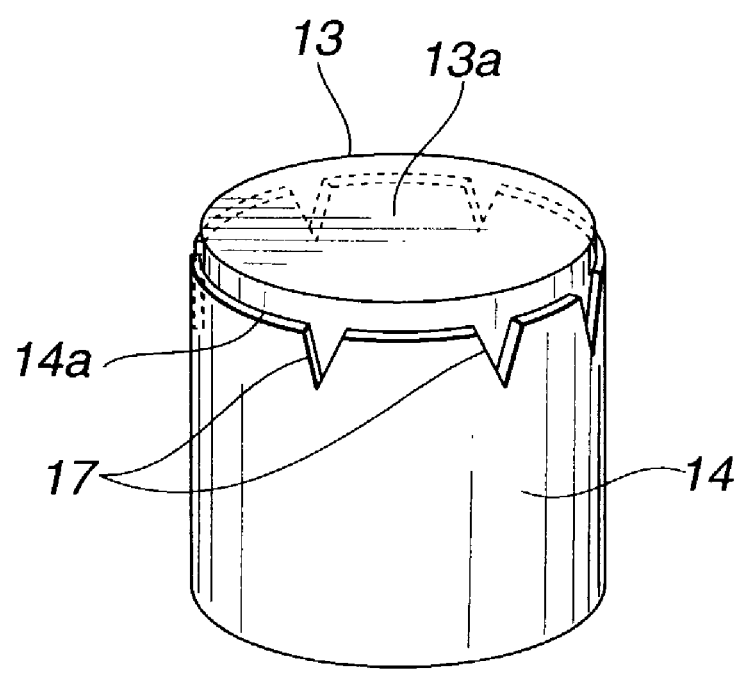
FIG. 5 is a perspective view similar to FIG. 2 but showing a modified example of the carrier supporting mat of the first embodiment catalytic converter according to the present invention.

Carrier support mat 14 is formed with V-shaped (in cross-section) cutouts or depressions 17, 17 located at its widthwise directional first end edge E3 which is perpendicular to lengthwise directional first and second edges E1, E2. It will be understood that upstream-side end face 14a is formed at widthwise directional first end edge E3 which is located on upstream-side relative to widthwise directional second end edge E4 with respect to flow of exhaust gas discharged from the engine. Thus, V-shaped cutouts 17, 17 serving as depressions for trapping foreign matters are formed at widthwise directional first end edge E3. Each V-shaped cutout 17 extends from widthwise direction first end edge E3 toward widthwise directional second end edge E4. Additionally, each V-shaped cutout 17 extends in a direction of thickness of carrier supporting mat 14. V-shaped cutouts 17, 17 are arranged at angular intervals of 180° in the wound state as shown in FIG. 2 in order to raise a trapping efficiency of foreign matters. Only one V-shaped cutout 17 may be formed at widthwise directional first edge E3. Otherwise, many (more than two) V-shaped cutouts 17 may be formed at widthwise directional first edge E3 as shown in FIG. 5.

Figure 4:
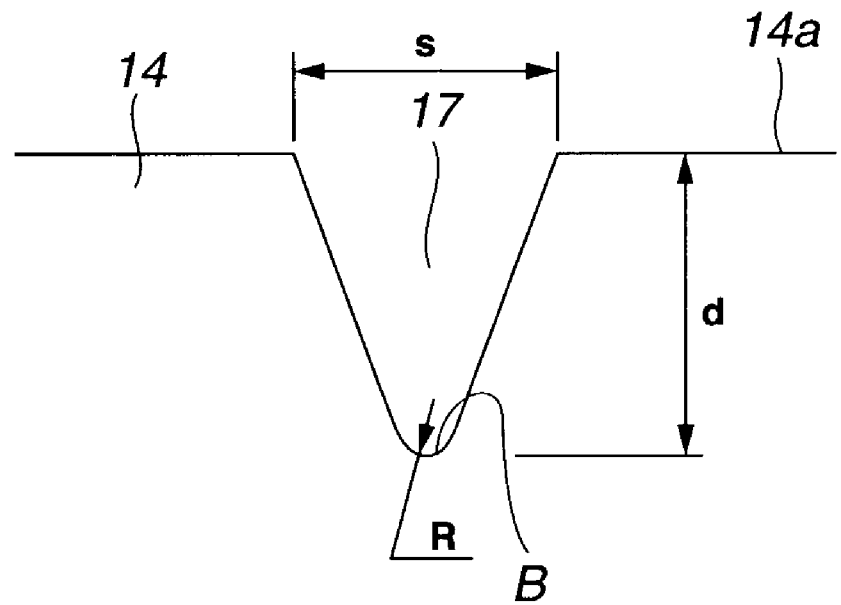
FIG. 4 is a fragmentary enlarged view of the carrier supporting mat of FIG. 3, showing in detail a V-shaped cutout.

As shown in FIG. 4, each V-shaped cutout 17 has a depth d ranging from 10 to 20 mm and a width (at widthwise directional first end edge E3) s ranging from 8 to 20 mm. Width s becomes gradually smaller in a direction far from widthwise directional first end edge E3 or in a direction toward widthwise directional second end edge E4 shown in FIG. 3. Widthwise directional second end edge E4 is parallel with widthwise directional first end edge E3 and perpendicular to lengthwise directional first and second edges E1, E2. Each V-shaped cutout 17 has a rounded bottom face B which is rounded in plan with a radius R as shown in FIG. 4. This radius R is preferably not larger than 2 mm for the purpose of securely trapping welding spatter and the like at the bottom section of each V-shaped cutout 17.

In this embodiment, as shown in FIG. 3, depth d of each V-shaped cutout is set such that a widthwise directional dimension W1 (=W−d) is larger than a width (widthwise directional dimension) W2 of rectangular projection 16a. Thus, with this arrangement in which widthwise directional dimension W1 is larger than widthwise directional dimension W2 of rectangular projection 16a, exhaust gas being prevented from being promoted in leak even though the V-shaped cutouts are formed while preventing lowering in supporting force for the catalyst carrier, regardless of the fact that widthwise directional dimension W2 corresponds to a section through which exhaust gas highly tends to leak. Additionally, width W2 of rectangular projection 16a is sufficient to prevent leaking of exhaust gas through the section through which exhaust gas highly tends to leak.

Figure 6A:
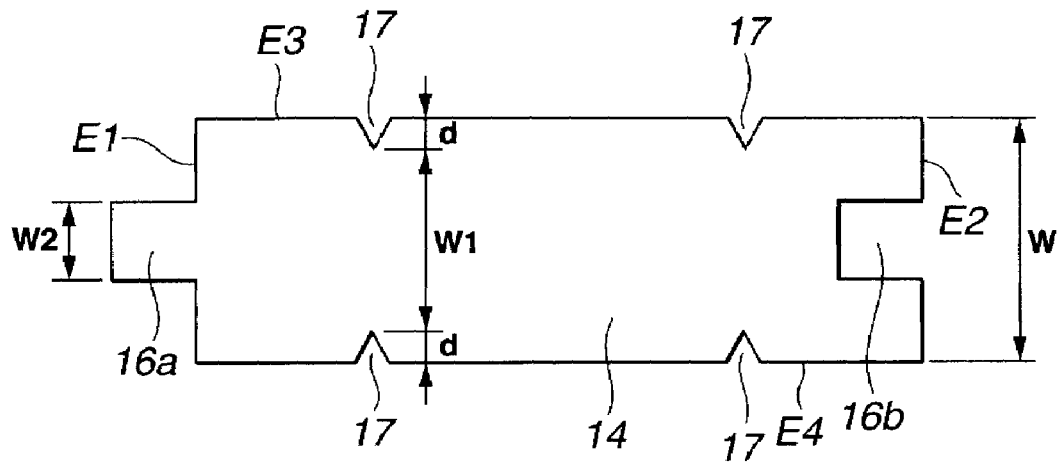
FIG. 6A is a development elevation similar to FIG. 3 but showing another modified example of the carrier supporting mat of the first embodiment catalytic converter according to the present invention.

Otherwise, V-shaped cutouts 17, 17 may be formed also at widthwise directional second end edge E4 as shown in FIG. 6A. With this arrangement, when carrier supporting mat 14 in the flat or developed state is wound around catalyst carrier 13, it becomes unnecessary to take account of the upstream-side and the downstream-side of the carrier supporting mat, thereby facilitating assembly operation for the catalytic converter. In this case, although the relationship of "W1>W2" is established, widthwise directional dimension W1 becomes "W1=W−2×d".

Figure 6B:
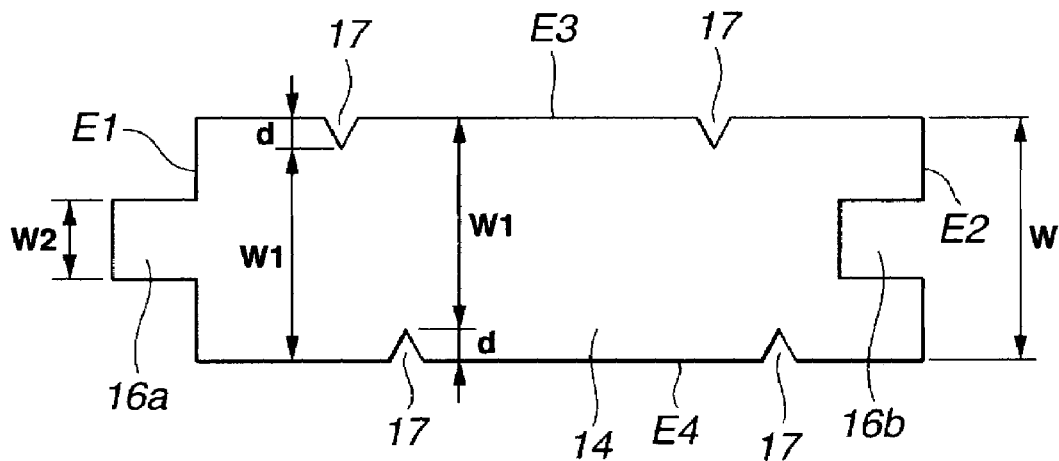
FIG. 6B is a development elevation similar to FIG. 3 but showing a further modified example of the carrier supporting mat of the first embodiment catalytic converter according to the present invention.

Further, in case that V-shaped cutouts 17, 17 are formed both at widthwise directional first and second end edges E3, E4, the positions of V-shaped cutouts at the widthwise directional first end edge E3 may be different in the lengthwise direction of the carrier supporting mat 14 from those at the widthwise directional second end edge E4 as shown in FIG. 6B. Also in this case, the relationship W1=W−d is established.

Figure 6C:
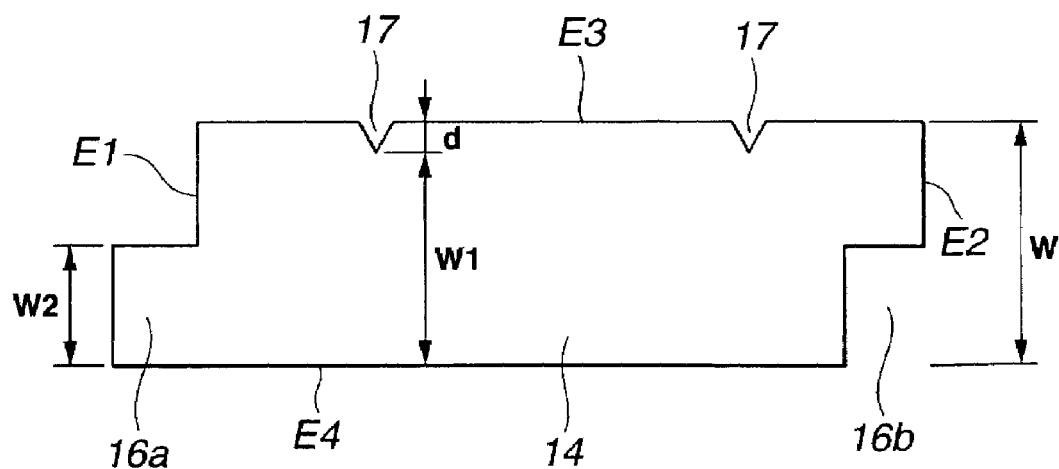
FIG. 6C is a development elevation similar to FIG. 3 but showing a still further modified example of the carrier supporting mat of the first embodiment catalytic converter according to the present invention.

Furthermore, rectangular projection and cutout 16a, 16b may be formed one-sided to widthwise directional second end edge E4 as shown in FIG. 6C. More specifically, rectangular projection 16a has its downstream-side edge which is aligned with widthwise directional second end edge E4, while cutout 16b also reaches the widthwise directional second end edge E4.

According to the above arrangement of the catalytic converter, even if foreign matters such as welding spatter (produced during formation of exhaust manifold 2 by pipe-welding or the like in a production process), remaining molding sand for casting, turnings produced in machining, and metal oxides produced during operation of the internal combustion engine are segregated and dropped under vibration or thermal fatigue and then reach the catalytic converter through the exhaust gas passageway so as to drop on upstream-side end face 14a of the carrier supporting mat, such foreign matters enter V-shaped cutouts 17 to be trapped while moving around on the upstream-side end face under exhaust gas flow and engine vibration. If the foreign matters once enter each V-shaped cutout, they can be prevented from flying out from the V-shaped cutout since each V-shaped cutout is formed to become smaller in width in a direction far from widthwise directional first end edge E3. Thus, the foreign matters can be securely trapped in the V-shaped cutouts 17. As a result, the foreign matters such as the welding spatter can be securely trapped thereby preventing damage or breakage of catalyst carrier 13 without lowering the supporting force of carrier supporting mat 14 and leaking exhaust gas through the carrier supporting mat.

In case that the catalytic converter is positioned such that its axis is inclined relative to the vertical direction, a conical hole whose cross-sectional area is reduced in a direction toward widthwise directional second end edge E4 may be formed at widthwise directional first end edge E3 of the carrier supporting mat, in place of each V-shaped cutout 17.

Figure 7:
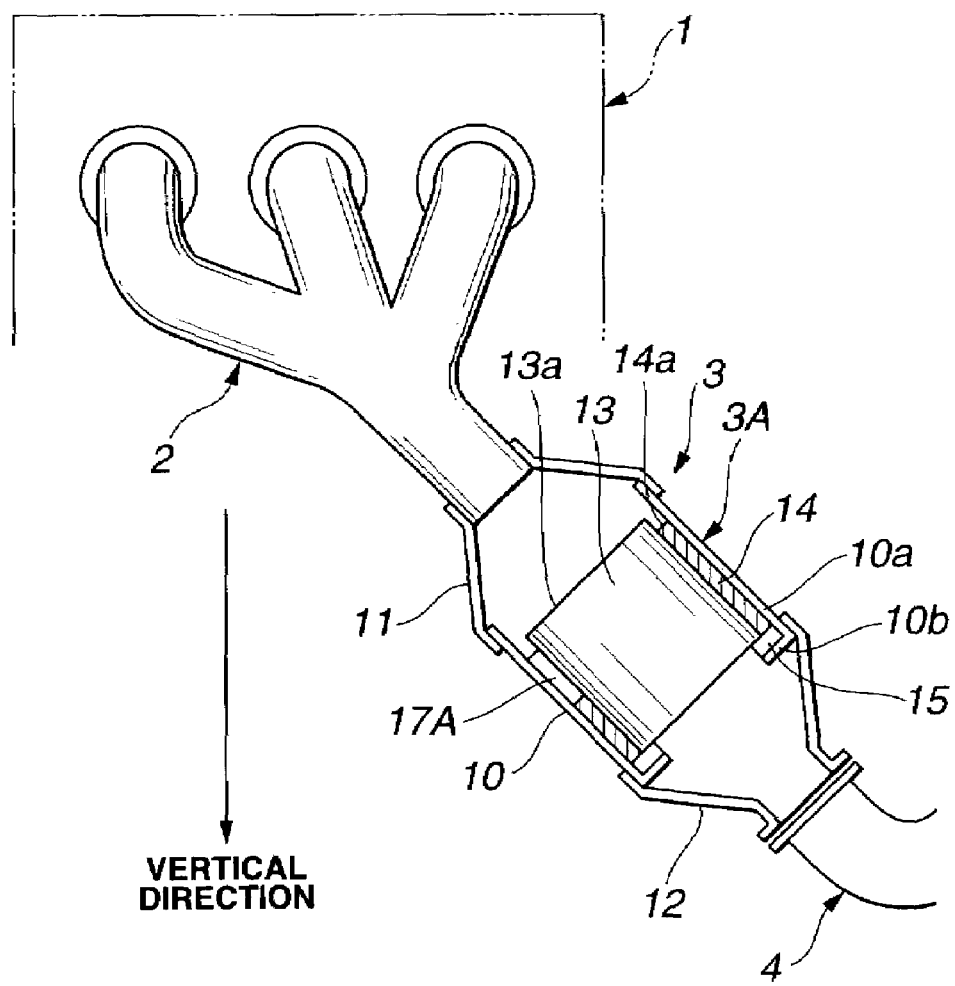
FIG. 7 is a schematic cross-sectional view of a second embodiment of a catalytic converter according to the present invention, installed to the exhaust system of the internal combustion engine.
Figure 8:
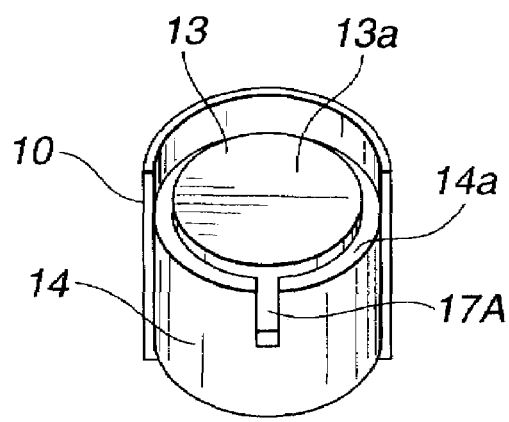
FIG. 8 is a perspective view, partly in section, of a unit including the catalyst carrier and the carrier supporting mat in the catalytic converter of FIG. 7, as viewed from a left-side direction on FIG. 7.

FIGS. 7 to 10 illustrate a second embodiment of catalytic converter 3 according to the present invention, similar to the first embodiment catalytic converter. In this embodiment, catalytic converter 3 is positioned such that its axis is inclined relative to the vertical direction. As shown in FIG. 8, when carrier supporting mat 14 is in the wound state established after being wound around the outer peripheral surface of catalyst carrier 13, upstream-side end face 14a of carrier supporting mat 14 and upstream-side end face 13a of catalyst carrier 13 are not flash with each other, and therefore upstream-side end face 14a of carrier supporting mat 14 is positioned slightly lower than or downstream relative to upstream-side end face 13a of catalyst carrier 13 so as to form the annular groove between the inner peripheral surface of casing main body 10 and the outer peripheral surface of catalyst carrier 13.

Figure 9:
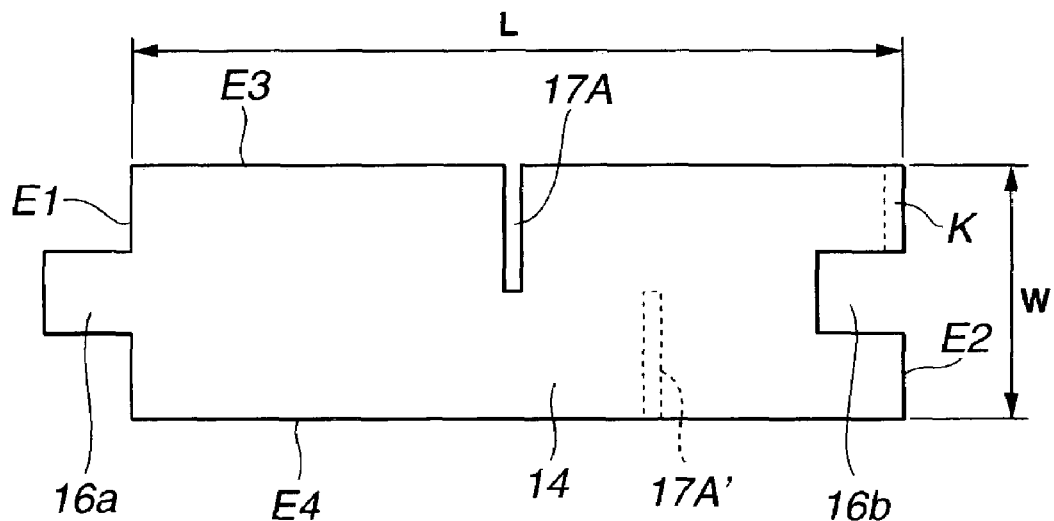
FIG. 9 is a development elevation of the carrier supporting mat of FIG. 8, showing various modes of straight elongate cutouts.
Figure 10:
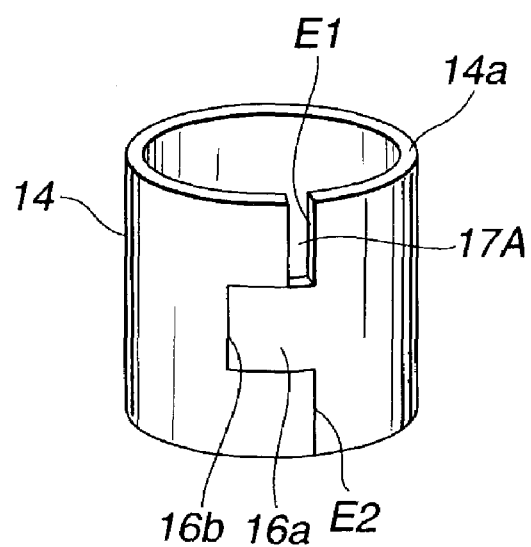
FIG. 10 is a perspective view of the carrier supporting mat in the wound state, showing a mode of the straight elongate cutout formed at lengthwise directional end edges.

Straight elongate cutouts 17A, 17A serving as depressions for trapping foreign matters are formed at widthwise directional first end edge E3 which is located on upstream-side relative to the widthwise directional second end edge E4 with respect to flow of exhaust gas discharged from the engine. One of straight elongate cutouts 17A, 17A is located at lengthwise directional central part of the carrier supporting mat 14 and extends toward widthwise directional second end edge E4. Another straight elongate cutout 17A is formed by cutting out a part K of a lengthwise directional second end section (not identified) containing lengthwise directional second end edge E2, of carrier supporting mat 14 as shown in FIG. 9 representing the development elevation of the carrier supporting mat. The part K contains a part of the lengthwise directional second end edge E2 and extends from widthwise directional first end edge E3 to rectangular cutout 16b. The cutout part K forms the straight elongate cutout 17A when the carrier supporting mat is wound around catalyst carrier 13 as illustrated in FIG. 10 in which projection 16a is fitted in cutout 16b thereby preventing exhaust gas from leaking through the clearance between lengthwise directional first and second end edges E1, E2 of carrier support mat 14. Each straight elongate cutout 17A extends from widthwise direction first end edge E3 toward widthwise directional second end edge E4. Additionally, each straight elongate cutout 17A extends in a direction of thickness of carrier supporting mat 14.

Otherwise, straight elongate cutout 17A' may be formed also at widthwise directional second end edge E4 as shown in FIG. 9. With this arrangement, when carrier supporting mat 14 in the flat or developed state is wound around catalyst carrier 13, it becomes unnecessary to take account of the upstream-side and the downstream-side of the carrier supporting mat, thereby facilitating assembly operation for the catalytic converter.

It is preferable that straight elongate cutout 17A is formed at widthwise directional first (or upstream-side) end edge E3 and located at the lower-side of carrier supporting mat 14, more specifically around the lower-most site of end edge E3, in a condition in which the axis of catalytic converter 3 is inclined relative to the vertical direction as clearly illustrated in FIG. 7.

According to the above arrangement of the second embodiment catalytic converter, if the foreign matters such as the welding spatter, the remaining molding sand for casting, the turnings produced in machining, and the metal oxides produced during operation of the internal combustion engine are segregated and dropped under vibration or thermal fatigue and then reach the catalytic converter through the exhaust gas passageway, the foreign matters drop onto upstream-side end face 14a of the carrier supporting mat along the inclined upstream-side end face 13a of the catalyst carrier 13 since end face 13a is inclined relative to the vertical direction. Accordingly, the foreign matters such as welding spatter cannot stay on end face 13a of the catalyst carrier, thereby preventing catalyst carrier 13 from being damaged owing to moving-around of the foreign matters on end face 13a of catalyst carrier.

The foreign matters such as the welding spatter easily enter straight elongate cutout 17A since the straight elongate cutout is located in a direction where the foreign matters drop. Even if the foreign matters drop far from straight elongate cutout 17A, they can be carried along upstream-side end face 14a of the carrier supporting mat and reach and are trapped in straight elongate cutout 17A since upstream-sided end face 14a is inclined as seen from FIG. 7 forming a bottom surface of the annular groove formed between the inner peripheral surface of casing main body 10 and the outer peripheral surface of catalyst carrier 13. Thus, the foreign matters such as the welding spatter can be securely trapped in straight elongate cutout 17A.

Figure 11:
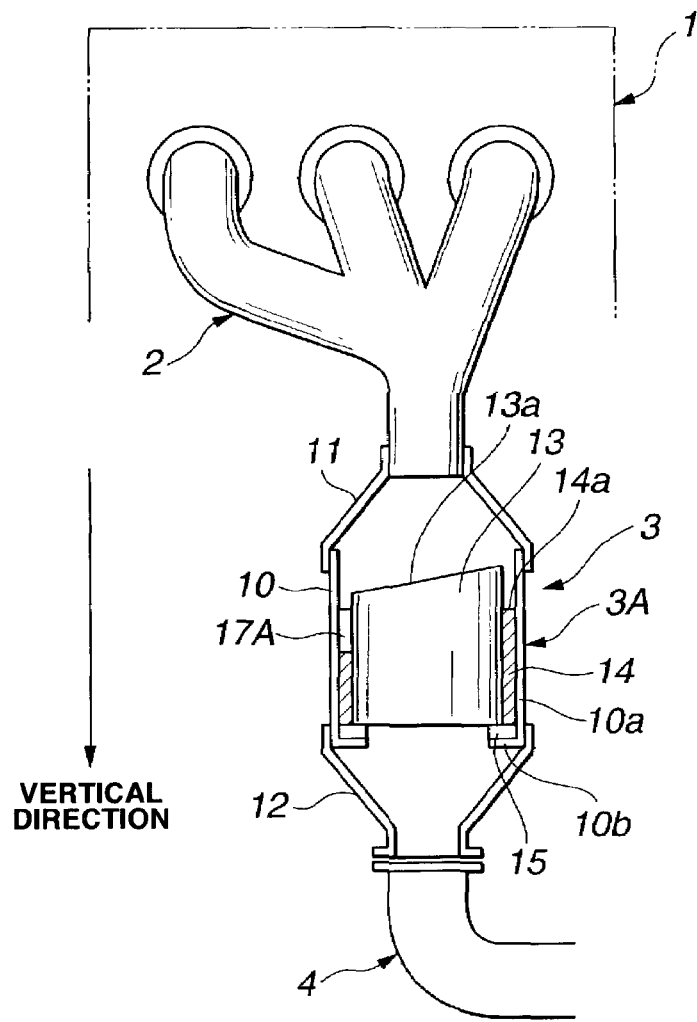
FIG. 11 is a schematic cross-sectional view of a third embodiment of the catalytic converter according to the present invention, installed to the exhaust system of the internal combustion engine.
Figure 12:
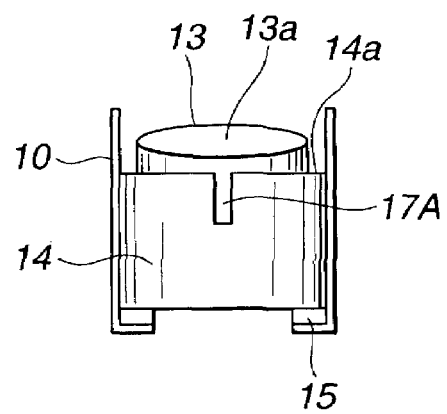
FIG. 12 is a side view, partly in section, of a unit including the catalyst carrier and the carrier supporting mat in the catalytic converter of FIG. 11, as viewed from a left-side direction on FIG. 11.

FIGS. 11 to 12 illustrate a third embodiment of the catalytic converter according to the present invention, similar to the second embodiment catalytic converter. In this embodiment, catalytic converter 3 is disposed in such a manner that its axis extends vertically or in the vertical direction. In this case, the upstream-side end face of catalyst carrier 13 is flat and inclined relative to an imaginary plane (not shown) perpendicular to the axis of catalyst carrier 13 as shown in FIG. 11. Straight elongate cutout 17A is located near a lower side of the upstream-side end face of catalyst carrier 13 as seen from FIGS. 11 and 12.

Also with this arrangement, when the foreign matters such as the welding spatter are segregated and dropped under vibration and thermal fatigue so as to reach catalyst carrier 13 of catalytic converter 3, they are guided along the inclined upstream-side end face of catalyst carrier 13 and dropped to upstream-side end face 14a of carrier supporting mat 14 to be trapped into straight elongate cutout 17A.

Figure 13A:
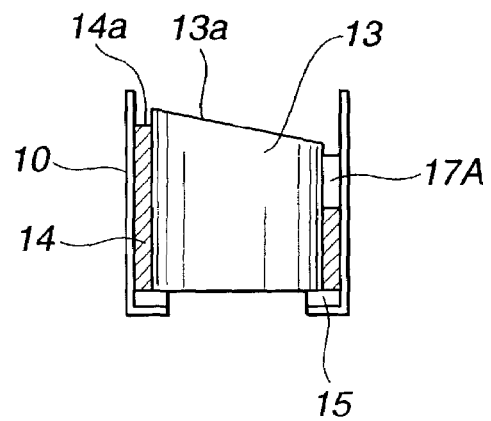
FIG. 13A is a cross-sectional view of the unit including the catalyst carrier and the carrier supporting mat in a fourth embodiment catalytic converter according to the present invention.
Figure 13B:
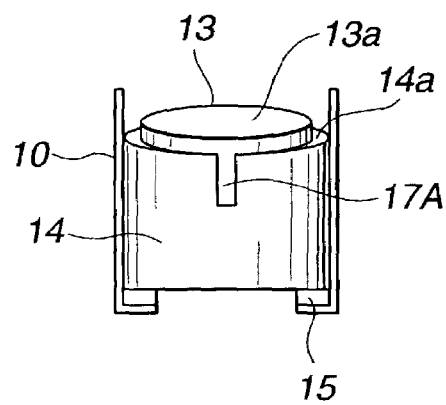
FIG. 13B is a side view, partly in section, of the unit of FIG. 13A.
Figure 14:
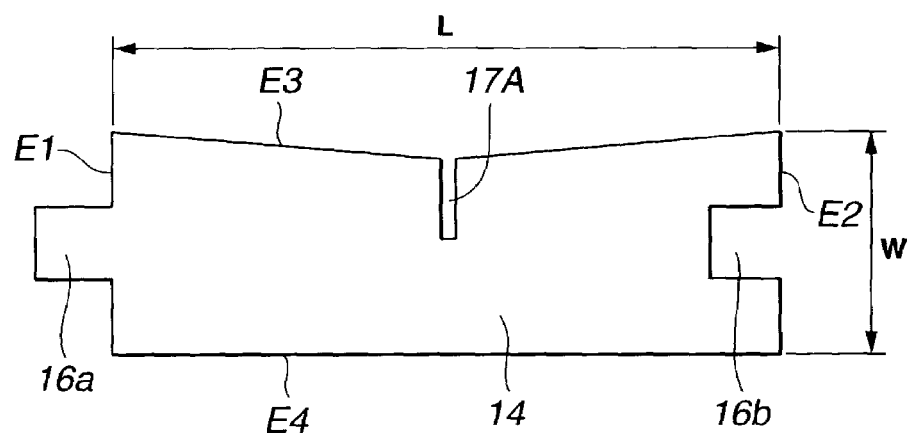
FIG. 14 is a development elevation of the carrier supporting mat of FIG. 13A.

FIGS. 13A to 14 illustrate a fourth embodiment of the catalytic converter 3, similar to the third embodiment catalytic converter. In this embodiment, catalytic converter 3 is disposed in such a manner that its axis extends vertically or in the vertical direction, similarly to the third embodiment. In this case, the upstream-side end face of catalyst carrier 13 is flat and inclined relative to an imaginary plane (not shown) perpendicular to the axis of catalyst carrier 13, similarly to the third embodiment. Additionally, in this embodiment, upstream-side end face 14a of carrier supporting mat 14 is inclined relative to the imaginary plane perpendicular to the axis of catalyst carrier 13. Straight elongate cutout 17A is formed at the lower-most site of upstream-side end face 14a of carrier supporting mat 14 and near the lower-side of the upstream-side end face of catalyst carrier 13. In this embodiment, carrier supporting mat 14 in the developed or flat state is shown in FIG. 14.

With the thus arranged catalytic converter, when the foreign matters such as the welding spatter are segregated and dropped under vibration and thermal fatigue so as to reach catalyst carrier 13 of catalytic converter 3, they are guided along inclined upstream-side end face 13a of catalyst carrier 13 and dropped to upstream-side end face 14a of carrier supporting mat 14. At this time, even if the foreign matters drop far from straight elongate cutout 17A, they are guided along upstream-side end face 14a inclined in the same direction as upstream-side end face 13a of catalyst carrier 13, and reach and trapped in straight elongate cutout 17A. Thus, the foreign matters such as the welding spatter can be securely trapped in straight elongate cutout 17A.

Figure 15A:
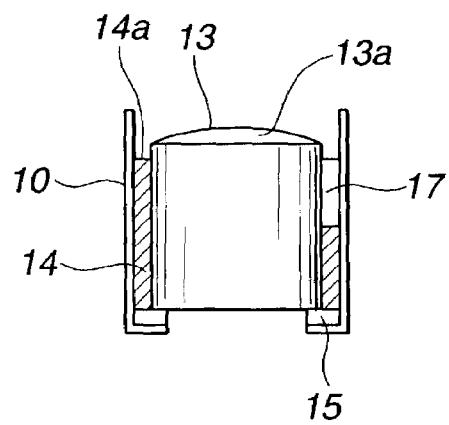
FIG. 15A is a cross-sectional view of the unit including the catalyst carrier and the carrier supporting mat in a fifth embodiment of the catalytic converter according to the present invention.
Figure 15B:
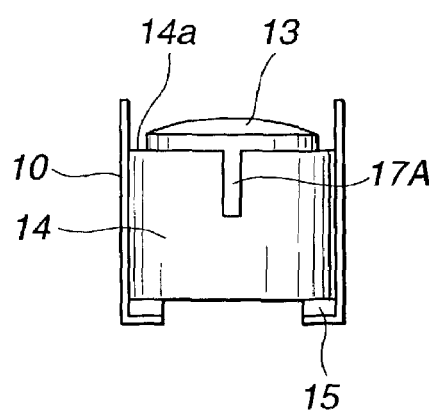
FIG. 15B is a side view, partly in section, of the unit of FIG. 15A.

FIGS. 15A and 15B illustrate a fifth embodiment of the catalytic converter according to the present invention, similar to the second embodiment catalytic converter 3. In this embodiment, catalytic converter 3 is disposed in such a manner that its axis extends vertical or in the vertical direction, or that its axis is inclined relative to the vertical direction. In this case, upstream-side end face 13a of catalyst carrier 13 is formed convex. Upstream-side end face 13a may have a part of a spherical surface, a conical surface, one of other convex and curved surfaces, and the like as far as it is projected at a central part and inclined to be lowered toward a peripheral part.

Also with the thus arranged catalytic converter, when the foreign matters such as the welding spatter are segregated and dropped under vibration and thermal fatigue so as to reach catalyst carrier 13 of catalytic converter 3, they slip down along convex upstream-side end face 13a of catalyst carrier 13 without staying here and dropped to upstream-side end face 14a of carrier supporting mat 14 located around upstream-side end face 13 of the catalyst carrier 13. During moving-around of the foreign matters on the upstream-side end face of carrier supporting mat 14, the foreign matters are trapped in straight elongate cutout 17A.

Figure 16:
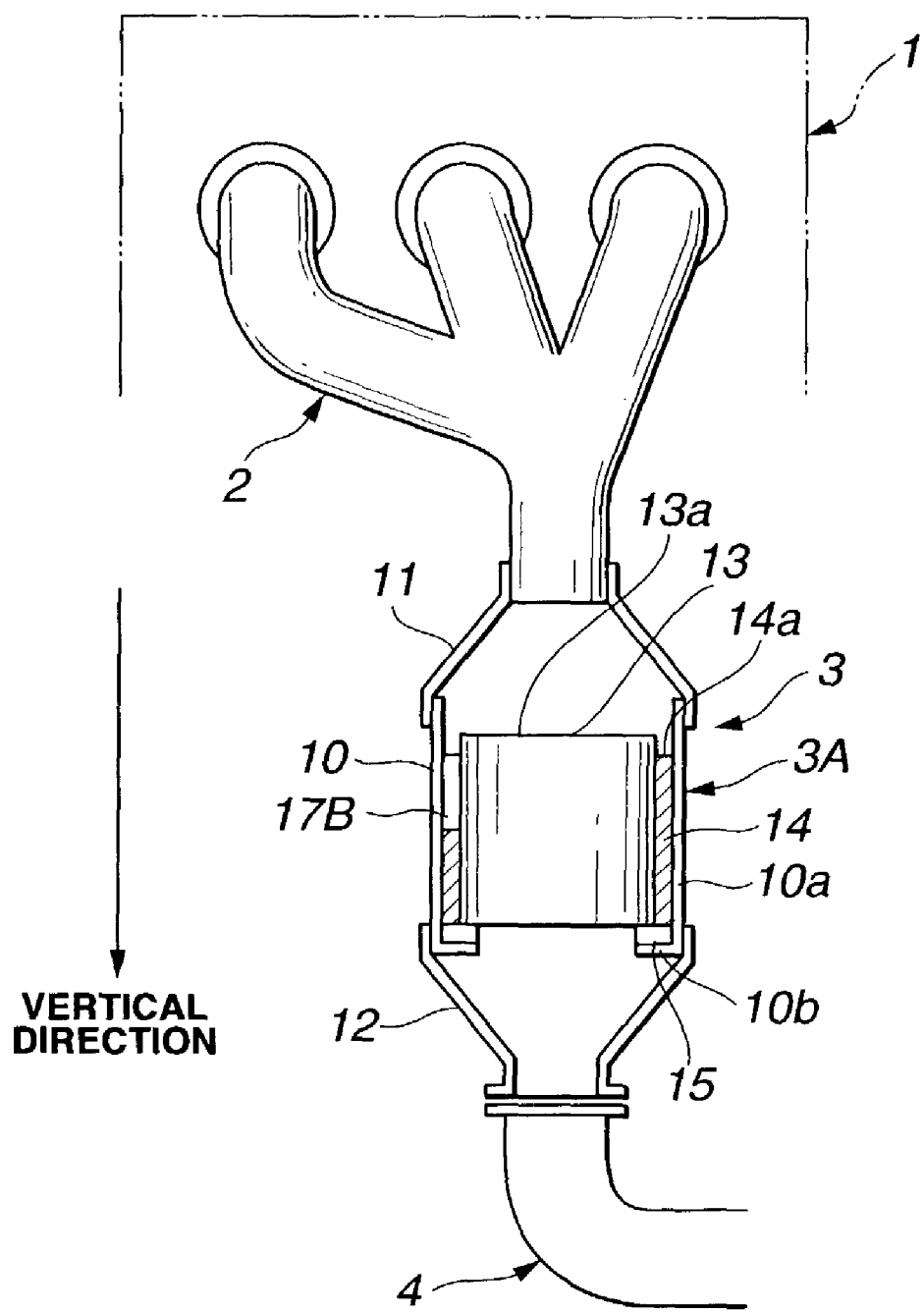
FIG. 16 is a schematic cross-sectional view of a sixth embodiment of the catalytic converter according to the present invention, installed to the exhaust system of the internal combustion engine.

FIGS. 16 to 19 illustrate a sixth embodiment of the catalytic converter according to the present invention, similar to the second embodiment catalytic converter. In this embodiment, catalytic converter 3 is disposed in such a manner that its axis extends vertically or in the vertical direction as shown in FIG. 16, or may be disposed in such a manner that its axis is inclined relative to the vertical direction. In this embodiment, carrier support mat 14 is formed with a generally zigzag cutout 17B (for trapping the foreign matters) located at its widthwise directional first (upstream-side) end edge E3. In other words, zigzag cutout 17B extends from widthwise directional first end edge E3. Zigzag cutout 17B includes a straight vertical upstream-side section S1, a straight lateral central section S2 and a straight vertical downstream-side section S3. Vertical upstream-side section S1 extends from widthwise directional first end edge E3 and is perpendicular to widthwise directional first end edge E3. Lateral central section S2 is connected with vertical upstream-side section S1 and is perpendicular to vertical upstream-side section S1, forming a bend section (not identified). Vertical downstream-side section S3 is connected with lateral central section S2 and extends perpendicular to lateral central section S2, forming a bend section (not identified).

Figure 18:
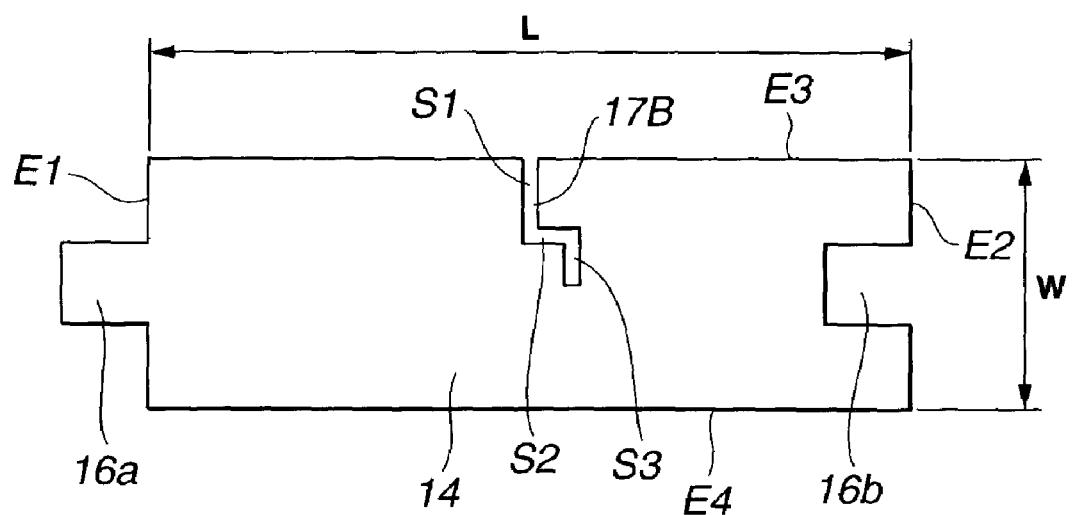
FIG. 18 is a development elevation of the carrier supporting mat of FIG. 17.

In this embodiment, at least a part (lateral central section S2 in this instance) of zigzag cutout 17B extends in a direction perpendicular to the flow direction of exhaust gas in the catalytic converter, i.e., in a direction crossing the direction of flow of exhaust gas. In other words, zigzag cutout 17B includes a central part which extends in a peripheral direction of the carrier supporting mat 14 in the wound state. Carrier supporting mat 14 in the flat or developed state is shown in FIG. 18.

With the thus arranged catalytic converter, when the foreign matters such as the welding spatter enter zigzag cutout 17B, they can be securely prevented from flying out from the zigzag cutout since the zigzag pattern of cutout 17B provides a physical hindrance against flying-out action of the foreign matters.

Figure 19:
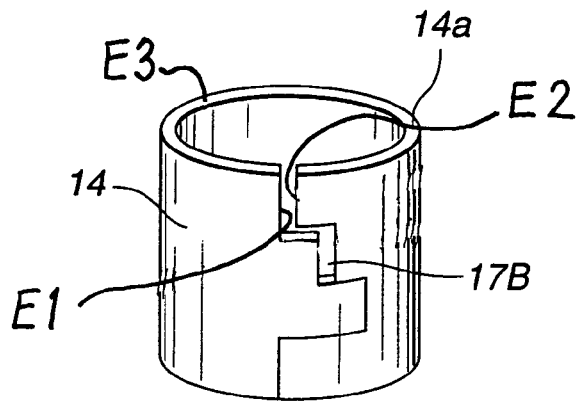
FIG. 19 is a perspective view of the carrier supporting mat usable in the catalytic converter of FIG. 16, showing a modified example of the zigzag cutout.

Otherwise, zigzag cutout 17B may be formed as follows to obtain carrier supporting mat 14 shown in FIG. 19: An upstream-side portion of the widthwise directional first end edge E1 relative to the rectangular projection 16a is formed zigzag, while an upstream-side portion of the widthwise directional second end edge E2 is formed zigzag, in which the zigzag upstream-side portions of the widthwise directional first and second end edges E1, E2 face each other and slightly separate from each other to form therebetween zigzag cutout 17B.

Figure 20:
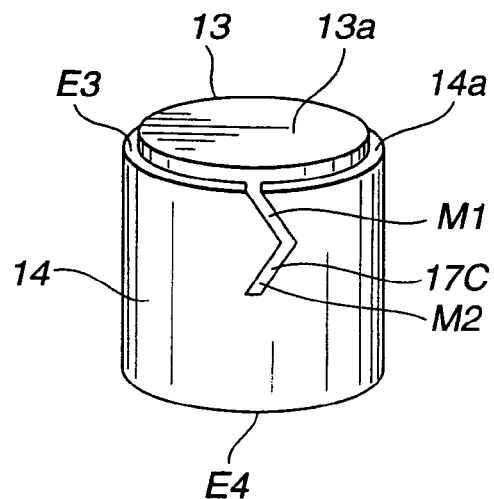
FIG. 20 is a perspective view of the unit including the catalyst carrier and the carrier supporting mat, in a seventh embodiment of the catalytic converter according to the present invention.

FIG. 20 illustrates a seventh embodiment of the catalytic converter according to the present invention, similar to the sixth embodiment catalytic converter with the exception that generally L-shaped cutout 17C is used in place of zigzag cutout 17B. Specifically, carrier support mat 14 is formed with generally L-shaped cutout 17C (for trapping the foreign matters) located at its widthwise directional first (upstream-side) end edge E3. In other words, L-shaped cutout 17C extends from widthwise directional first end edge E3. Zigzag cutout 17B includes a straight oblique upstream-side section M1, and a straight oblique downstream-side section M2. Oblique upstream-side section M1 extends from widthwise directional first end edge E3 and is angular to widthwise directional first end edge E3. Oblique downstream-side section M2 is angularly connected to oblique upstream-side section M1 and extends toward widthwise directional second end edge E4. Also in this embodiment, at least a part of L-shaped cutout 17C extends in a direction crossing the direction of flow of exhaust gas. Accordingly, the thus arranged catalytic converter can exhibit the same effects as those of the sixth embodiment catalytic converter. It will be understood that the catalytic converter of this embodiment can be configured by replacing winding cutout 17D shown in FIG. 19 with L-shaped cutout 17C.

Figure 17:
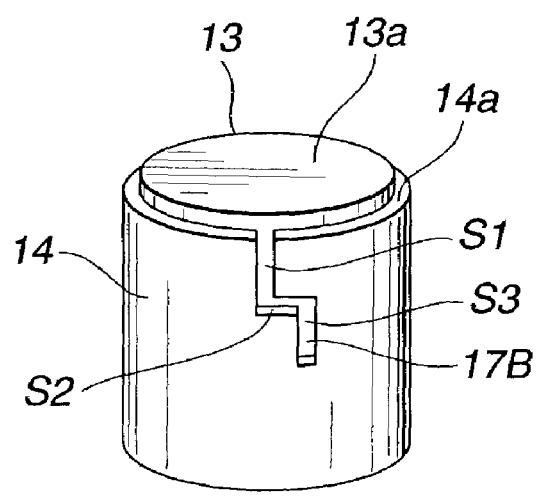
FIG. 17 is a perspective view of the unit including the catalyst carrier and the carrier supporting mat formed with a zigzag cutout, in the catalytic converter of FIG. 16.
Figure 21:
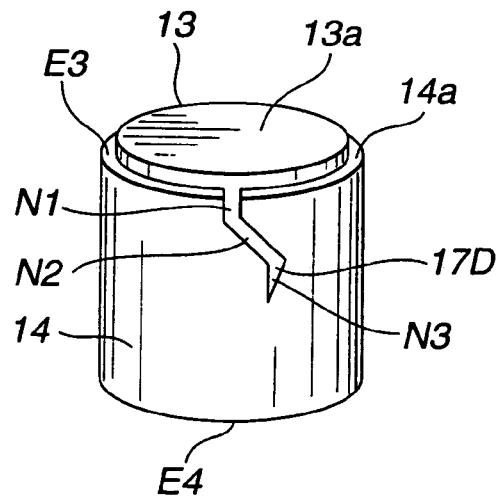
FIG. 21 is a perspective view of the unit including the catalyst carrier and the carrier supporting mat, in an eighth embodiment of the catalytic converter according to the present invention.

FIG. 21 illustrates an eighth embodiment of the catalytic converter according to the present invention, similar to the sixth embodiment catalytic converter shown in FIG. 17 only with the exception that winding cutout 17D is used in place of zigzag cutout 17B. Winding cutout 17D includes straight vertical upstream-side section N1, straight oblique central section N2 and V-shaped downstream-side section N3. Vertical upstream-side section N1 extends from widthwise directional first end edge E3 and is perpendicular to widthwise directional first end edge E3. Oblique central section N2 is connected with vertical upstream-side section N1 and extends obliquely toward widthwise directional second end edge E4. V-shaped downstream-side section N3 is connected with oblique central section N2 and extends straight toward widthwise directional second end edge E4 in such a manner that its width decreases in a direction far from widthwise directional first end edge E3. Also in this embodiment, at least a part (oblique central section S2 in this instance) of winding cutout 17D extends in a direction crossing the direction of flow of exhaust gas. It will be understood that the catalytic converter of this embodiment can be configured by replacing zigzag cutout 17B shown in FIG. 19 with winding cutout 17D.

The thus arranged catalytic converter can exhibit the same effects as those of the sixth embodiment catalytic converter. Additionally, the thus arranged catalytic converter has the winding cutout whose tip end section is formed V-shaped having a sharpened deep-most part, and therefore the foreign matters such as the welding spatter can be prevented from moving in the sharpened deep-most part, thereby further securely trapping the foreign matters.

Figure 22A:
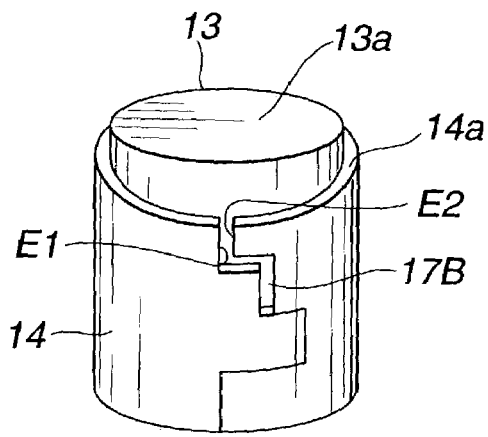
FIG. 22A is a perspective view of the unit including the catalyst carrier and the carrier supporting mat, showing a modified example of the sixth embodiment of the catalytic converter.
Figure 22B:
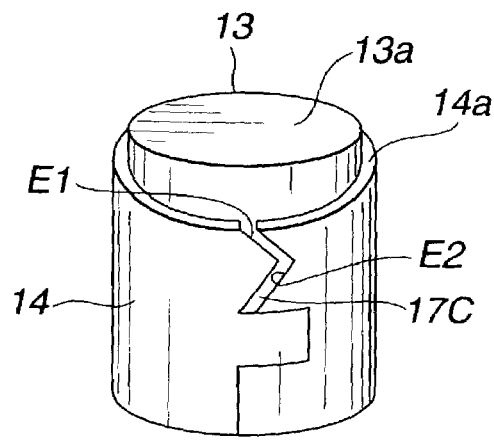
FIG. 22B is a perspective view of the unit including the catalyst carrier and the carrier supporting mat, showing a modified example of the seventh embodiment of the catalytic converter.
Figure 22C:
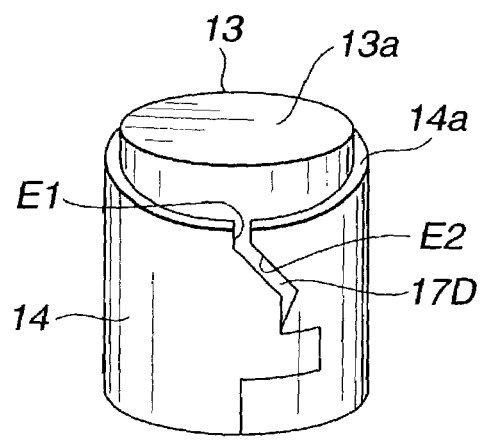
FIG. 22C is a perspective view of the unit including the catalyst carrier and the carrier supporting mat, showing a modified example of the eighth embodiment of the catalytic converter.
Figure 23A:
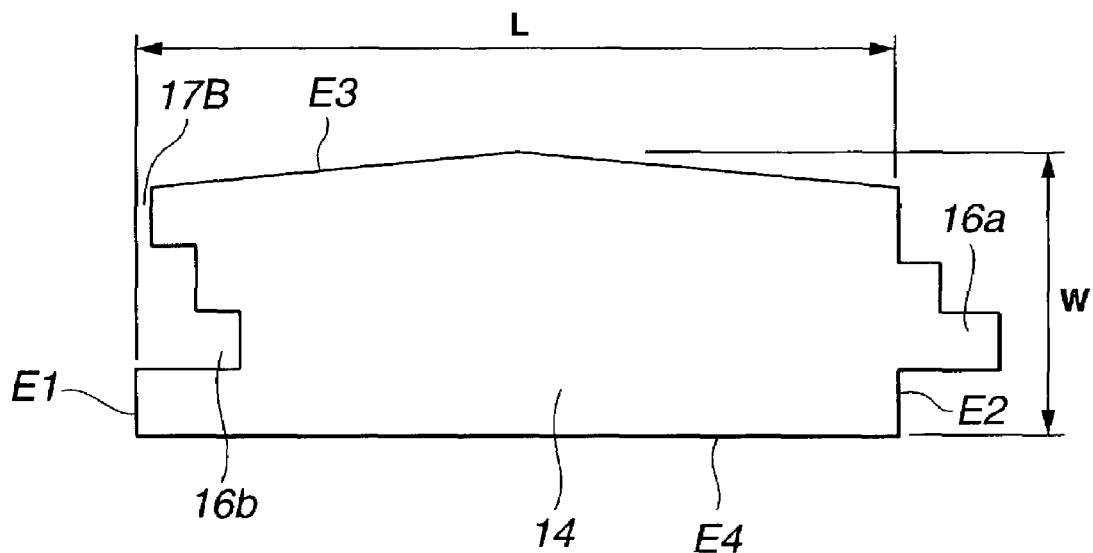
FIG. 23A is a development elevation of the carrier supporting mat of FIG. 22A.
Figure 23B:
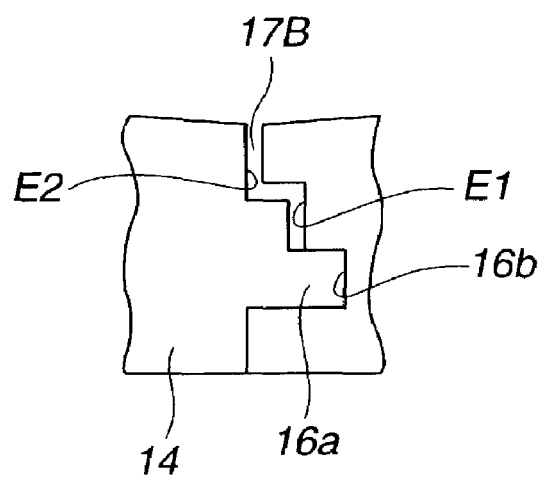
FIG. 23B is a fragmentary side view of the carrier supporting mat in the wound state, showing the zigzag cutout formed in the carrier supporting mat of FIG. 23A.

FIGS. 22A, 22B and 22C illustrate respectively essential parts of modified examples of the sixth, seventh and eighth embodiment catalytic converters, in which annular upstream-side end face 14a of carrier supporting mat 14 of each catalytic converter is inclined relative to a plane perpendicular to the axis of the catalyst carrier, in such a manner that cutout 17B, 17C, 17D is formed or located at the lower-most site of annular upstream-side end face 14a of carrier supporting mat 14. It will be seen that each of cutouts 17B, 17C, 17D is formed between the lengthwise directional first and second end edges E1, E2 of carrier supporting mat 14 in the wound state. For example, carrier supporting mat 14 of the modified example shown in FIG. 22A takes a development elevation shown in FIG. 23A, which will result in the wound state whose fragmentary side view is shown in FIG. 23B in which zigzag cutout 17B is formed between the lengthwise directional first and second end edges E1, E2.

With the thus arranged catalytic converters of the modified examples, when the foreign matters such as the welding spatter are dropped from upstream-side end face 13a of catalyst carrier 13 to upstream-side end face 14a of carrier supporting mat 14, they are guided along inclined annular upstream-side end face 14a of carrier supporting mat 14 and reach cutout 17B, 17C, 17D to be trapped in the cutout since annular upstream-side end face 14a forms a annular groove relative to the upstream-side end face 13a of catalyst carrier 13 while cutout 17B, 17C, 17D is located at the lower-most site of the upstream-side end face of the carrier supporting mat. Accordingly, the foreign matters such as the welding spatter can be securely trapped in cutout 17B, 17C, 17D.

It will be appreciated that straight elongate cutout 17A of each of the second, third, fourth and fifth embodiments may be replaced with at least one cutout 17B, 17C, 17D of the sixth, seventh and eighth embodiments. The cutout 17B, 17C, 17D has the bend section and a part extending in a direction crossing the direction of flow of exhaust gas. Additionally, at least one cutout 17B, 17C, 17D may be additionally formed in the carrier supporting mat of each of the second, third, fourth and fifth embodiments.

The entire contents of Japanese Patent Applications P2001-134783 (filed May 2, 2001) and P2001-134784 (filed May 2, 2001) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

The invention claimed is:

1. An exhaust gas purification apparatus for an engine, comprising:
   a casing that forms a part of an exhaust gas passage of the engine;
   a substrate, disposed in the casing, that carries a substance to purify exhaust gas; and
   a supporting mat for supporting the substrate in the casing, the supporting mat being located between the substrate and the casing and having a depression to trap foreign matters, the depression being formed at an upstream-side end face of the supporting mat,
   wherein the substrate is disposed such that an axis of the substrate is not perpendicular to a vertical direction so that an upstream-side end face of the substrate is inclined relative to a plane perpendicular to the vertical direction,
   wherein the depression of the supporting mat is located adjacent to a lower-most position of the upstream-side end face of the substrate in a condition where the exhaust gas purifying apparatus is installed to the engine.

2. An exhaust gas purification apparatus as claimed in claim 1, wherein the supporting mat has a first end formed with a projection and a second end formed with a recess, the projection of the first end engaging with the recess of the second end in a surround state around the substrate, and wherein a width in a direction of exhaust gas flow of the supporting mat where the depression is provided is larger than a width of the projection in a direction of exhaust gas flow.

3. An exhaust gas purification apparatus as claimed in claim 2, wherein the depression is a cutout formed at the upstream-side end of the supporting mat.

4. An exhaust gas purification apparatus as claimed in claim 1, wherein the depression exists at the upstream-side end of the supporting mat in a natural state of the supporting mat before the supporting mat surrounds the substrate.

5. An exhaust gas purification apparatus as claimed in claim 1, wherein the depression includes a portion extending in a direction crossing a direction of exhaust gas flow.

6. An exhaust gas purification apparatus as claimed in claim 1, wherein the substrate is disposed such that its axis is inclined relative to the vertical direction.

7. An exhaust gas purification apparatus as claimed in claim 1, wherein the upstream-side end of the substrate is inclined relative to a plane perpendicular to the direction of exhaust gas flow.

8. An exhaust gas purification apparatus as claimed in claim 1, wherein the upstream-side end of the substrate is formed convex.

9. An exhaust gas purification apparatus as claimed in claim 1, wherein the depression includes a bent portion.

10. An exhaust gas purification apparatus as claimed in claim 1, wherein the supporting mat has a first end formed with a projection and a second end formed with a recess, the projection of the first end engaging with the recess of the second end in a surround state of the supporting mat around the substrate, wherein the depression is formed between the first and second ends of the supporting mat.

11. An exhaust gas purification apparatus as claimed in claim 1, wherein the depression includes an end portion whose width decreases in a direction far from the upstream-side end of the supporting mat.

12. An exhaust gas purification apparatus as claimed in claim 1, wherein the depression of the supporting mat is V-shaped.

13. An exhaust gas purification apparatus as claimed in claim 1, wherein the supporting mat has a plurality of the depressions formed at the upstream-side end thereof, the plurality of the depression being arranged at equal intervals.

14. An exhaust gas purification apparatus as claimed in claim 1, wherein the supporting mat further includes a depression at a downstream-side end of the supporting mat.

15. An exhaust gas purification apparatus as claimed in claim 1, wherein the upstream-side end of the supporting mat is arranged at a downstream side of the upstream-side end of the substrate in a direction of exhaust gas flow.

16. An exhaust gas purification apparatus as claimed in claim 1, wherein the substrate is a ceramic monolithic.

17. An exhaust gas purification apparatus as claimed in claim 1, wherein the substrate is of a honeycomb structure having a plurality of gas passages, each gas passage being defined by thin partition walls having a thickness of not larger than 0.1 mm.

18. An exhaust gas purification apparatus as claimed in claim 1, wherein the casing is connected to an exhaust manifold of the engine which is formed by pipe-welding.

19. An exhaust gas purification apparatus as claimed in claim 1, wherein the casing is welded to an exhaust manifold of the engine.

20. An exhaust gas purification apparatus as claimed in claim 1, wherein the supporting mat is wound around the substrate in a manner that the upstream-side end face of the supporting mat is located at a downstream side of the upstream-side end face of the substrate in a direction of exhaust gas flow so as to form an annular groove around the substrate, the annular groove being connected with the depression.

21. An exhaust gas purification apparatus as claimed in claim 1, wherein the depression of the supporting mat is located such that the foreign matters on the upstream-side end face of the substrate are liable to drop and to be trapped in the depression.

22. An exhaust gas purification apparatus for an engine, comprising:

a casing that forms a part of an exhaust gas passage of the engine;

a substrate, disposed in the casing, that carries a substance to purify exhaust gas; and a supporting mat for supporting the substrate in the casing, the supporting mat being located between the substrate and the casing and having a depression to trap foreign matters, the depression being formed at an upstream-side end face of the supporting mat, wherein the substrate is disposed such that an axis of the substrate extends along a vertical direction, the substrate having an upstream-side end face which is inclined relative to a plane perpendicular to the vertical direction, wherein the depression of the supporting mat is located adjacent to a lower-most position of the upstream-side end face of the substrate in a condition where the exhaust gas purifying apparatus is installed to the engine.

* * * * *